(12) United States Patent
Mevert (10) Patent No.: US 9,926,670 B2
(45) Date of Patent: Mar. 27, 2018

(54) MOVABLE FIXTURE FOR MILLING RAIL HEADS AND PROCEDURE FOR REPLACING CUTTING PLATES FOR SUCH A FIXTURE

(71) Applicant: Schweerbau GmbH & Co. KG, Stadthagen (DE)

(72) Inventor: Frank Mevert, Lauenhagen (DE)

(73) Assignee: SCHWEERBAU GMBH & CO. KG, Stadthagen (DE)

( * ) Notice: Subject to any disclaimer, the term of this patent is extended or adjusted under 35 U.S.C. 154(b) by 301 days.

(21) Appl. No.: 14/715,685

(22) Filed: May 19, 2015

(65) Prior Publication Data
US 2015/0330034 A1 Nov. 19, 2015

(30) Foreign Application Priority Data
May 19, 2014 (EP) .................................. 14 401 062

(51) Int. Cl.
*B23Q 3/157* (2006.01)
*B23Q 11/08* (2006.01)
(Continued)

(52) U.S. Cl.
CPC .............. *E01B 31/13* (2013.01); *B23C 3/005* (2013.01); *B23C 5/08* (2013.01); *B23C 5/2226* (2013.01);
(Continued)

(58) Field of Classification Search
CPC ....... E01B 31/13; B23C 3/005; B23C 5/2226; B23C 5/2252; B23C 5/2278;
(Continued)

(56) References Cited

U.S. PATENT DOCUMENTS 3,701,187 A * 10/1972 Erkfritz .................. B23C 5/207
407/46
4,862,647 A * 9/1989 Vieau ...................... E01B 31/17
451/347
(Continued)

FOREIGN PATENT DOCUMENTS

CA 2905065 A1 9/2014
DE 3222208 A1 12/1983
(Continued)

*Primary Examiner* — Erica E Cadugan
(74) *Attorney, Agent, or Firm* — Leydig, Voit & Mayer, Ltd.

(57) ABSTRACT

A movable fixture for milling rail heads of slide rails arranged in a track bed includes: a rotating milling head mounted in a milling head drive mechanism supported by a chassis. The milling head has at least one cutting tooth comprising several cutting plates for milling the rail heads and a disc-shaped tool carrier connected to the milling head drive mechanism. The tool carrier includes cassettes assembled with cutting plates arranged around their periphery. The cassettes are arranged in several carrier segments connected to the tool carrier so they can be detached. The cassettes are arranged peripherally on the tool carrier with at least two assembled cutting plates, the cassettes being different with regard to at least one of: a number of cutting teeth; distances of the cutting teeth from each other; rake angle of the individual cutting plates; or inclination angle of the individual cutting plates.

20 Claims, 10 Drawing Sheets

(51) Int. Cl.
*B23C 3/12* (2006.01)
*E01B 31/13* (2006.01)
*B23C 5/08* (2006.01)
*B23C 5/22* (2006.01)
*B23C 3/00* (2006.01)
*B23Q 3/155* (2006.01)

(52) U.S. Cl.
CPC .......... *B23C 5/2234* (2013.01); *B23C 5/2282* (2013.01); *B23C 5/2295* (2013.01); *B23Q 3/15536* (2016.11); *B23Q 3/15713* (2013.01); *B23C 2215/32* (2013.01); *B23Q 3/15539* (2016.11); *B23Q 11/08* (2013.01); *B23Q 2003/15537* (2016.11); *B23Q 2003/155407* (2016.11); *B23Q 2003/155411* (2016.11); *Y10T 29/49732* (2015.01); *Y10T 407/191* (2015.01); *Y10T 407/1926* (2015.01); *Y10T 407/1932* (2015.01); *Y10T 407/1944* (2015.01); *Y10T 409/303752* (2015.01); *Y10T 409/306384* (2015.01); *Y10T 483/10* (2015.01); *Y10T 483/115* (2015.01); *Y10T 483/1736* (2015.01); *Y10T 483/1779* (2015.01); *Y10T 483/1845* (2015.01)

(58) Field of Classification Search
CPC ... B23C 5/2282; B23C 5/2291; B23C 5/2295; B23C 2215/32; B23C 5/2234; B23C 5/08; Y10T 409/306384; Y10T 407/191; Y10T 407/1926; Y10T 407/1932; Y10T 407/1944
USPC ........................... 409/178; 407/35, 43, 46, 52
See application file for complete search history.

(56) References Cited

U.S. PATENT DOCUMENTS

| | | | |
|---|---|---|---|
| 4,993,193 A | 2/1991 | Panetti | |
| 5,123,786 A * | 6/1992 | Yates | B23C 5/12 407/25 |
| 5,163,788 A * | 11/1992 | Dahl | B23C 5/2234 407/101 |
| 5,293,718 A | 3/1994 | Favaron | |
| 5,566,437 A | 10/1996 | Jaeggi | |
| 5,676,505 A * | 10/1997 | Gauss | B23C 3/30 407/51 |
| 6,139,410 A | 10/2000 | Okumura et al. | |
| 6,497,537 B1 * | 12/2002 | Francis | B23C 5/08 407/37 |
| 2010/0104382 A1 | 4/2010 | Heinloth et al. | |
| 2012/0288342 A1 * | 11/2012 | Rungger | B23C 3/005 409/231 |
| 2013/0045055 A1 | 2/2013 | Derycke et al. | |
| 2014/0271012 A1 | 9/2014 | Hughes et al. | |
| 2015/0240428 A1 * | 8/2015 | Hartl | E01B 31/12 29/402.19 |
| 2016/0236286 A1 * | 8/2016 | Heinloth | B23C 5/08 |
| 2017/0252835 A1 * | 9/2017 | Saffels | B23C 5/14 |

FOREIGN PATENT DOCUMENTS

| | | |
|---|---|---|
| DE | 102006008093 A1 | 9/2007 |
| EP | 0431746 A1 | 6/1991 |
| EP | 1820902 A1 | 8/2007 |
| EP | 1983100 A2 * | 10/2008 |
| FR | 2557488 A * | 7/1985 |
| GB | 2121710 A | 1/1984 |
| JP | 63105813 A | 5/1988 |
| JP | 07229702 A | 8/1995 |
| JP | 2510537 B2 | 6/1996 |
| JP | 2002-052413 A * | 2/2002 |
| JP | 2010521328 A | 6/2010 |
| KR | 19990088002 A | 2/1999 |
| WO | WO-95/20071 A1 * | 7/1995 |
| WO | WO-2010/056021 A2 * | 5/2010 |
| WO | WO-2013/086547 A1 * | 6/2013 |
| WO | WO 2014040095 A2 | 3/2014 |
| WO | WO-2015/106928 A1 * | 7/2015 |

* cited by examiner

Embodiment Wherein In a Milling Space of the Operator's Cab, Two Milling Heads and Two Lifting Devices are Provided, Wherein Each Lifting Device is Assigned to a Respective One of the Two Milling Heads

FIG. 18

MOVABLE FIXTURE FOR MILLING RAIL HEADS AND PROCEDURE FOR REPLACING CUTTING PLATES FOR SUCH A FIXTURE

CROSS-REFERENCE TO PRIOR APPLICATION

Priority is claimed to European Patent Application No. EP 14 401 062.6, filed on May 19, 2014, the entire disclosure of which is hereby incorporated by reference herein.

FIELD

The invention relates to a movable fixture for milling rail heads of rail tracks arranged in a track bed, said fixture comprising a rotationally driven milling head, which is mounted in a chassis supporting a milling head drive mechanism, wherein the milling head has at least one cutting tooth made of a plurality of cutting plates for milling rail heads, wherein each cutting plate forms a lane on the running surface of the rail track and each cutting tooth comprises a certain number of cutting plates that matches the number of curved sections to be milled or lanes of the respective rail head.

The invention further relates to a method for replacing cutting plates in a movable fixture for milling of rail heads of rail tracks arranged in a track bed, said fixture comprising a rotationally driven milling head that comprises at least one cutting tooth made of a plurality of cutting plates.

BACKGROUND

The profile of a rail head is made up of approximately circular curved sections with different radii, wherein each curved section forms a lane on the running surface of the rail track. The milling head or each cutting tooth comprises as many cutting plates as curved sections or lanes of the respective rail head to be milled.

Milling refers to chip-removing machining of materials, such as metal, using a milling cutter. The cutting movement necessary for chipping is produced by rotation of the cutting tool relative to the workpiece that is held stationary.

A movable fixture for milling rail heads is described in the publication DE 10 2006 008 093 A1. In this fixture, the rail heads of the rail tracks arranged in a track bed are machined using a rotationally driven milling head. The milling head is in a chassis that is mounted on a fixture that is movable on the rail tracks and comprises a plurality of cutting plates. Each of the cutting plates is detachably mounted on the milling head.

SUMMARY

A movable fixture for milling rail heads of slide rails arranged in a track bed comprising: a rotating milling head mounted in a milling head drive mechanism supported by a chassis, wherein the milling head has at least one cutting tooth comprising several cutting plates for milling the rail heads and a disc-shaped tool carrier connected to the milling head drive mechanism, the tool carrier including cassettes assembled with cutting plates arranged around their periphery, the cassettes being arranged in several carrier segments connected to the tool carrier so they can be detached, and wherein the cassettes are arranged peripherally on the tool carrier with at least two assembled cutting plates, the cassettes being different with regard to at least one of: a number of cutting teeth; distances of the cutting teeth from each other; rake angle of the individual cutting plates; or inclination angle of the individual cutting plates.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

In an embodiment, the present invention provides a generic fixture for milling rail heads of rail tracks arranged in a track bed and a method for replacing the cutting plates of such a fixture, wherein the time required for replacing the cutting plates is minimized and/or the service life of the cutting plates is maximized and/or machining of the tracks is achieved while maintaining a high-quality surface of milled work.

Thus, according to the invention, a movable fixture is proposed for milling rail heads of rail tracks arranged in a track bed, said fixture comprises a rotationally driven milling head, which is mounted in a chassis supporting a milling head drive mechanism, wherein the milling head has a disk-shaped tool carrier that comprises peripherally arranged cassettes fitted with cutting plates, said cassettes are arranged at a plurality of carrier segments that are detachably connected to the tool carrier, wherein the tool carrier is connected to the milling head drive mechanism. It is possible to minimize the time required for replacing the cutting plates on the milling head by this subdivision of the milling head in a tool carrier, which circumferentially houses a plurality of easily replaceable carrier segments, at each of which a plurality of cassettes are in turn mounted, wherein a plurality of cutting plates are arranged on each of the cassette. In the case of a one-piece milling head, as is usual in milling fixtures for rail machining according to the prior art, the individual cutting plates must be removed from the milling head and new cutting plates must be adjusted and fixed in the milling head in case of wear of the cutting plates. The entire milling head is generally replaced to circumvent this elaborate replacement of cutting plates in the track bed, namely in a locked track. In the process, the milling head is replaced before entering the track locked for machining.

The segmentation of the milling head according to the invention also allows implementation of milling heads with diameters of more than two meters and/or a mass of 250 kg, since these can be replaced quickly while replacing the cutting plates due to the attachment in groups on a carrier segment and/or a cassette. The individual carrier segments with the cassettes arranged thereon are dimensioned many times smaller than the entire milling head in terms of dimension and mass, which allows them to be easily handled manually and/or automatically.

Since milling of rail tracks is accompanied by track or route closures and is carried out usually at night, it is necessary to allow quick and easy replacement of the cutting plates especially in case of wear of the cutting plates when machining the track. In the prior art, it is usual that a milling head equipped with new cutting plates is kept ready for such a case and the milling head with the worn cutting plates is replaced with it. However, as a complete milling head is heavy and unwieldy, this is only produced in small diameters, which allows only a small feed rate. During scheduled replacement of the milling head, this must be removed from a drive shaft. The adjacent track must also be often locked for this activity.

The invention makes it possible to quickly and easily replace a plurality of cutting plates depending on their wear, since only individual carrier segments are replaced at the milling head and whole groups of cutting plates are replaced with these segments. Due to the smaller dimensions of the carrier segments relative to a total milling head, the replacement can also be in situ, namely in the locked track, with only a brief interruption in machining the track. Nobody has to leave the fixture to replace the carrier segments. Thus, the invention makes it possible to replace the cutting plates in a fixture on a track to be machined, without having to suspend work in the track or to lock adjacent tracks.

The fixture is intended for locomotion by means of the chassis, in particular on the rail track to be machined. The feed direction of the fixture is not fixed. The feed direction of the fixture and the direction of rotation of the milling head determine whether the milling head is working synchronously or in the opposite direction. It has proved advantageous that the milling head is moved synchronously along the feed direction. The tool carrier of the milling head also called carrier disk is mounted on a shaft and/or a flange.

Proposed here according to the invention is also the arrangement of at least two cassettes on the tool carrier of the milling head, wherein the cassettes are equipped with cutting plates and differ from each other in terms of the number of cutting teeth and/or the distances between the cutting teeth and/or the rake angle of the individual cutting plates and/or the inclination angle of the individual cutting plates. Only cassettes that are different from each other are arranged on the milling head in order to achieve a particularly effective differential division. If a plurality of identical cassettes are arranged on the milling head, it is advantageous that all rotational angles between adjacent identical cassettes are different. The differential division can be set according to the invention, since the individual cassettes are detachably connected to the milling head, thus quickly and easily allowing another differential division by the replacement of even a single cassette with a different cassette. Because of the easy interchangeability of all cassettes, even among themselves, wherein, in particular, each cassette can be positioned anywhere on the milling head, the differential division is continuously adapted to the working and ambient conditions. An advantageous development of the milling head is proposed by at least one of the aforementioned features.

It is favorable that a plurality of cassettes that are also called cutter holders are arranged on a carrier segment. Furthermore, a plurality of cutting plates are arranged on the cassette. Segmentation allows the quick and easy replacement of larger groups of cutting plates by replacing the carrier segments. The further division, in which a plurality of cassettes are arranged on each carrier segment and a plurality of cutting plates are attached to each of the cassettes, facilitates the replacement of small groups of cutting plates. In the subdivision according to the invention, each cutting plate need not be aligned and adjusted separately, in particular, in the working space of the fixture. The maintenance and replacement of the cutting plates at the cassettes can be accomplished by replacement of entire cassette sets away from the fixture, for example, in a workshop set up for this purpose, without restricting the operation of the fixture.

By a constant, in particular, alternating replacement of only some of the cassettes of a carrier segment, uniform wear of the cutting plates of the milling head and a continuous high-quality surface of milled work is achieved.

The fact that the carrier segments and the cassettes are set up for universal mounting of each one of the cassettes at each one of the carrier segments and in any position on a carrier segment has proven advantageous. On the one hand, this makes replacement easier as attention need not be paid to exact allocation of the cassettes to certain positions. On the other hand, this opens up the possibility to easily and quickly equip each carrier segment, thus the entire milling head, depending on the usage situation.

To this end, it has proven to be advantageous that the same number of cassettes is detachably attached at each one of the carrier segments, wherein five to eight cassettes are preferably arranged on a carrier segment. Moreover, the carrier segments, and the tool carrier are so flexibly designed that it is possible to mount each one of the carrier segments in each position on the tool carrier that is intended for housing a carrier segment.

It is particularly convenient that the tool carrier has a polygonal cross-sectional shape, i.e. the outer contour of the circumference of the tool carrier corresponds to a uniform polygon. In this case, the circumference of the tool carrier consists of a plurality of, in particular more than six, preferably eight to twelve contact surfaces. Each of the contact surfaces is intended to house one of the identical carrier segments. The easy interchangeability of the carrier segments on the tool carrier simplifies the preparation of the carrier segments and the mounting of the carrier segments on the tool carrier.

The contact surfaces are designed as secant areas on the radially outer side of the tool carrier. The contact surfaces are preferably oriented perpendicular to the radius at the point of the least distance to the axis of rotation.

An even number of carrier segments has always proven to be particularly convenient for handling replacement of the carrier segments for all sizes of the milling heads. The invention includes embodiments with different divisions of the tool carrier and a corresponding number of carrier segments. The number of 3-5 carrier segments has proven advantageous for small milling heads, for example, with a diameter of 200 to 600 millimeters. The number of 4-8 carrier segments has proven advantageous for milling heads with an average diameter of 500 to 1,200 millimeters. For large milling heads having a diameter from 1,000 to 2,500 millimeters, it is advantageous to provide more than 7 carrier segments. Preferably, the use of a milling head with a diameter from 1,400 to 1,600 millimeters is proposed.

According to the invention, a method is proposed for replacing the cutting plates, wherein a plurality of cutting plates are simultaneously replaced as a group when reaching a specified wear criterion of the cutting plates. This makes it possible to quickly replace the cutting plates of the milling head of the fixture with little effort even if the fixture is on the rail track to be machined. Usual wear criteria are, for example, the real wear, the operating time, the machining path of the individual cutting plates and/or the groups of cutting plates and/or the milling head. In contrast to the prior art, a preventive replacement of the cutting plates is not required. Only when one or more of the wear criteria occur, the cutting plates are replaced, wherein only those carrier segments and/or cassettes are replaced in the milling head on which cutting plates are arranged, for which the wear criterion is met.

Preferably, the fixture for applying the method is characterized by at least one of the above-mentioned features.

The simultaneous replacement of a plurality of cutting plates as a group is preferably carried out by successively replacing one or more of the carrier segments from the disk-shaped tool carrier of the milling head with another carrier segment that is kept ready. On each one of the carrier segments, different cassettes are arranged, at least one of which is equipped with a plurality of peripherally arranged cutting plates. To replace the carrier segments, the carrier segment fixed to the tool carrier is first detached from it and then removed from its position on the milling head. Subsequently, another carrier segment that is kept ready at this position is arranged on the tool carrier, and finally connected to the tool carrier. The rotation of the milling head is blocked when replacing a carrier segment. When replacing several or all of the carrier segments, the milling head is turned after replacement of a carrier segment until the next carrier segment to be replaced is in a favorable position for removal. Thus, several carrier segments of a milling head are replaced successively. Despite this serial replacement of the carrier segments, the invention allows rapid exchange of several cutting plates. Thus, the replacement of cutting plates is possible with less downtime.

The carrier segments that are kept ready are taken from a magazine and the carrier segments removed from the milling head are stored in a magazine. Preferably, it involves the same magazine, which reduces the space required in the fixture. The fact that the magazine has at least one slot more than the number of contact surfaces provided for the carrier segments on the milling head has proven advantageous. This makes it possible that a carrier segment removed from the milling head always has one free slot, in which the carrier segment can be stored before another carrier segment, for example, with new cutting plates, is removed from the magazine.

It is advantageous that the fixture comprises a operator's cab that is supported by the chassis and is limited by cab walls that are parallel to the direction of travel. The operator's cab consists of two rooms—the fitting space and the milling space. A lockable opening is provided between the two spaces. This makes it possible to create zones of varying contamination and to separate the milling space, also acoustically, from the fitting space particularly during operation of the milling head. The milling head, the milling head drive mechanism and the adjustment means are arranged within the milling space. Opening up of the opening allows replacement of the carrier segments, without someone having to leave the fixture for this purpose. Thus, the invention makes it possible to replace the cutting plates in a fixture on a track to be machined, without having to suspend work in the track or to lock adjacent tracks.

The opening may be designed as a simple roller shutter or curtain. But it is also possible to design the opening in the form of a lock. Purpose of the lockable opening is essentially to keep the dust and chips waste accumulating in the milling space from the fitting space set up as a workshop.

Since the activities can be done in the operator's cab protected by the cab walls, it is even possible that the adjacent tracks can continue to allow movement of the fixture at control speed in case of outage. Furthermore, the operator's cab protects against weather and has numerous ergonomic advantages, for example, sufficient, glare-free illumination of workplaces can be provided in fitting space. With an appropriate vibration decoupling of the fitting space from the trucks and/or the milling space, it can also be worked in the fitting space during transfer travel and/or operation of the milling head.

The fact that the operator's cab includes a lifting device that comprises a segment gripper for transporting the carrier segments has proven to be particularly practical. In a simple embodiment, the segment gripper is capable of translational movement in the plane of rotation of the milling head, parallel and perpendicular to the direction of travel. According to a development of this embodiment, the segment gripper can be rotated around an axis, in particular, around an axis that is oriented parallel to the plane of rotation of the milling head and it is also capable of translational movement, parallel and perpendicular to the direction of travel. The movement, perpendicular to the direction of travel, is preferably oriented radial to the axis of rotation of the milling head. Using the lifting device, individual carrier segments of the milling head can be moved to the magazine and vice versa. The lifting device can be used for mechanical support of the working forces during manual replacement of the carrier segments or it can be configured for fully automated replacement of the carrier segments. The lifting device may also be provided with the option of moving the segment gripper parallel to the axis of rotation of the milling head.

The individual carrier segments are connected to the tool carrier via a locking device. The locking device is provided for tool-free operation and can be triggered manually or automatically. The locking device preferably consists of at least one passive and at least one active part. In this case, each of the carrier segments is equipped with at least one passive part. At least one active part of the locking device is also provided on each one of the contact surfaces of the tool carrier and/or on each of the slots of the magazine. The joint use of the locking device and the lifting device allows for automatic replacement of the carrier segments.

The option of tool-free actuation of the locking device simplifies the replacement of the cutting plates and the fixture is quickly returned to its operational status. Once a carrier segment adjoins the tool carrier, the retaining means is operated, and thus the carrier segment is fixed on the tool carrier.

The contact surfaces on the tool carrier and/or the carrier segments are designed such that placement or removal of a carrier segment from the tool carrier with the opened locking device takes place by at least one translational movement along an axis, which is oriented radially and/or axially to the rotational axis of the milling head. The carrier segments and the tool carriers are designed so that the carrier segments can be handled independently during replacement. Thus, it is possible to also replace only the individual carrier segments of the milling head. The tool carrier also designated as a supporting disk has a plurality of contact surfaces to house the tool segments. Each carrier segment has at least one mounting surface that is designed equivalent to a contact surface. Thus, the carrier segments may be individually fixed to the tool carrier or released from the same.

Another embodiment of the invention proposes the replacement of the cassettes arranged on the carrier segments and/or replacement of cutting plates individually attached to the cassettes in a carrier segment that is removed from the tool carrier or a cassette that is removed from the tool carrier, which is performed, for example during operation of the milling head and/or the movement of the fixture. To this end, the carrier segments are machined in the fitting space of the operator's cab of the fixture. In the process, either individual cutting plates are directly replaced or the cassettes supporting the cutting plates are initially removed from the carrier segments and replaced with other cassettes. The replacement of a few or all of the cutting plates at the preferably removed cassettes can also be done in the fitting space set up as a workshop. By shifting the cumbersome disassembly and assembly of individual cutting plates at the cassette to a specially equipped place and the provision of at least one set of additional cassettes fitted with cutting plates, it is possible that the fixture can quickly resume operation and need not wait for individual machining of all cutting plates.

It is also advantageous in the method that one, several or all of the cassettes are replaced within the fixture at a carrier segment removed from the milling head. This replacement can be performed even during operation of the milling head and/or during the movement of the fixture. Replacing the cutting plates on the cutter holders either in the fitting space or away from the fixture, for example, in a specially equipped workshop has proven to be practical.

Replacing the cassettes at the carrier segments is preferably carried out on a working table in the fitting space of the operator's cab. The working table is equipped with a plurality of slots. All of the slots assigned to a milling head is also referred to as a magazine. The slots can be racks, so that the magazine is designed in the form of a pan. The individual slots can also be implemented as an active part of a locking device.

The successive arrangement of the slots in an axis that is oriented parallel to the plane of rotation of the milling head and/or the slidable mounting of the magazine between a maintenance position and a replacement position lying in the plane of rotation of the milling head has proven to be a practical. The displacement of the magazine is parallel to the axis of rotation, i.e. perpendicular to the plane of rotation of the milling head. This makes it possible that the segment gripper of the lifting device may have to be moved only in the plane of rotation of the milling head for replacing the carrier segments, and thus it can be done in a more simple and easy way. Moreover, a movement space that accommodates staff for replacing the cutting plates and/or cassettes is available between the cab wall and the working table in a magazine that is held in a maintenance position. In the magazine, a second set of carrier segments is stored, namely a set prepared with new cutting plates before replacing the carrier segments or with used cutting plates after replacing the carrier segments.

Alternatively or in addition to the displacement of the magazine, the segment gripper or the whole lifting device is designed, so as to be capable of translational movement, parallel to the axis of rotation, namely perpendicular to the plane of rotation of the milling head.

The milling head and the milling head drive mechanism are stored together on the adjusting means. The milling head and the milling head drive mechanism are adjustable together in a plane vertically oriented to the rail track. This adjustment is particularly useful for the displacement of the milling head between a working position, in which the milling head engages with the rail track, and a transfer position, which is taken for a transfer travel of the fixture to the site of use or away from this, or when crossing special track fittings such as switches.

According to a particular embodiment, two adjustable milling heads that are driven independently of each other are arranged in the milling space, wherein each milling head is assigned to a rail track. In this case, a single adjustable lifting device can be provided between the planes of rotation of the two milling heads or two lifting devices, each one of which is assigned to the one of the two milling heads, are arranged in the operator's cab.

Both the contact surfaces of the tool carrier and the mounting surfaces of the carrier segments have a flat shape. A particular embodiment proposes that the flatness is locally interrupted by parts of the locking device and/or optional force transducers. The fact that the mutually associated contact surfaces and mounting surfaces are executed parallel to the contour has proven to be particularly practical. This allows proper-fit assembly and disassembly of the carrier segments as well as the removal of a carrier segment from the tool carrier or approach of the tool carrier by a carrier segment in a simple motion relative to the spatial geometry. In particular, the carrier segments, and the tool carrier are designed for placement or removal of the carrier segments from the tool carrier—radially and/or axially to the axis of rotation of the tool carrier.

The milling head has locking devices for detachably connecting the carrier segments with said tool carrier. Using the locking devices it is also possible to adjust the carrier segments relative to one another and to align them on the tool carrier, and to connect the carrier segments detachably to the tool carrier. The locking devices are provided for tool-free operation. According to a preferred embodiment, the locking devices act radially to the axis of rotation. Using the locking devices, the carrier segments are aligned on the tool carrier relative to the latter in all spatial directions. The locking devices particularly absorb forces that act radially and laterally on the axis of rotation and transfer these from the carrier segments to the tool carrier. It has proven advantageous that a locking device is made of a pairing of a pin with an especially rotational symmetry design and a bush. In another embodiment, a locking device consists of a pair of tongue and groove. Depending on the size of the carrier segment, two to four, preferably three locking devices are provided.

It is advantageous that the pin and/or the groove has an undercut, on which a clamping mechanism of the bush and/or the groove acts. The clamping mechanism is used for centering and fixing the carrier segment on the tool carrier. Notwithstanding this, the clamping mechanism can also be part of pin and/or groove and the undercut can be formed the groove and/or the bush. Such a retaining means with pin and bush helps in fixing, holding and aligning the tool segments on the carrier disk in a component and a single step, without manual handling of tools. The retaining means are preferably designed such that they are switchable using a pressurized fluid.

An electrically and/or hydraulically and/or pneumatically operated clamping mechanism can be used for disassembly and reassembly in an automated manner and/or without tools. Fully automated replacement of tool segments is also possible using a locking device comprising a controllable clamping mechanism.

An embodiment of the milling head with reinforcement for absorbing the radial, tangential and/or axial forces has force transducers on the contact surfaces and mounting surfaces. The force transducers are designed in the form of dowel pins and/or as a pair of tongue and groove. The force transducers are also suitable for alignment and for holding the carrier segments of the tool carrier. Furthermore, the force transducers may have a particularly radially acting undercut.

The different layouts of the individual cutting plates at the milling head have proven to be an advantage. Proposed here is the arrangement of at least two cassettes on at least one of the carrier segments, wherein the cassettes differ from each other in terms of the number of cutting teeth and/or the distances between the cutting teeth and/or the rake angle of the individual cutting plates and/or the inclination angle of the individual cutting plates. Due to the uneven distribution of the cutting plates along the circumference of the milling head, it is possible to reduce vibrations of the milling head and to reduce the associated waviness in the micrograph. Through the individual and irregularly changing arrangement of the cutting plates, vibrations are reduced in the milling head and a good machining quality is achieved even at high feed rate.

Such a variable, differential division that is adjustable during outage, in which the individual arrangement of the cutting plates is selected, depending on the ambient conditions, the properties of the material to be machined, the weather conditions, the shape of the rail head profile, the steel grade, the feed rate, the removal depth or the speed of rotation can very easily be achieved by an individual compilation of differently configured cassettes on a carrier segment or along the periphery of the milling head.

A cutting tooth comprises eight to nine cutting plates for the rail head contour, which are arranged in a plurality of, preferably two rows along the circumferential direction, offset from one another and one behind the other.

Furthermore, it is favorable that the fixture comprises adjustment means which are suitable for positioning the milling head height and/or the length. An adjustment of the length corresponds to a shift of the milling head parallel to its axis of rotation. An adjustment of the height relates to the distance of the milling head to the rail track, especially in the vertical direction. The adjustment of the height can be achieved by a translational and/or rotational movement of the rotational axis of the milling head.

Figure 1:
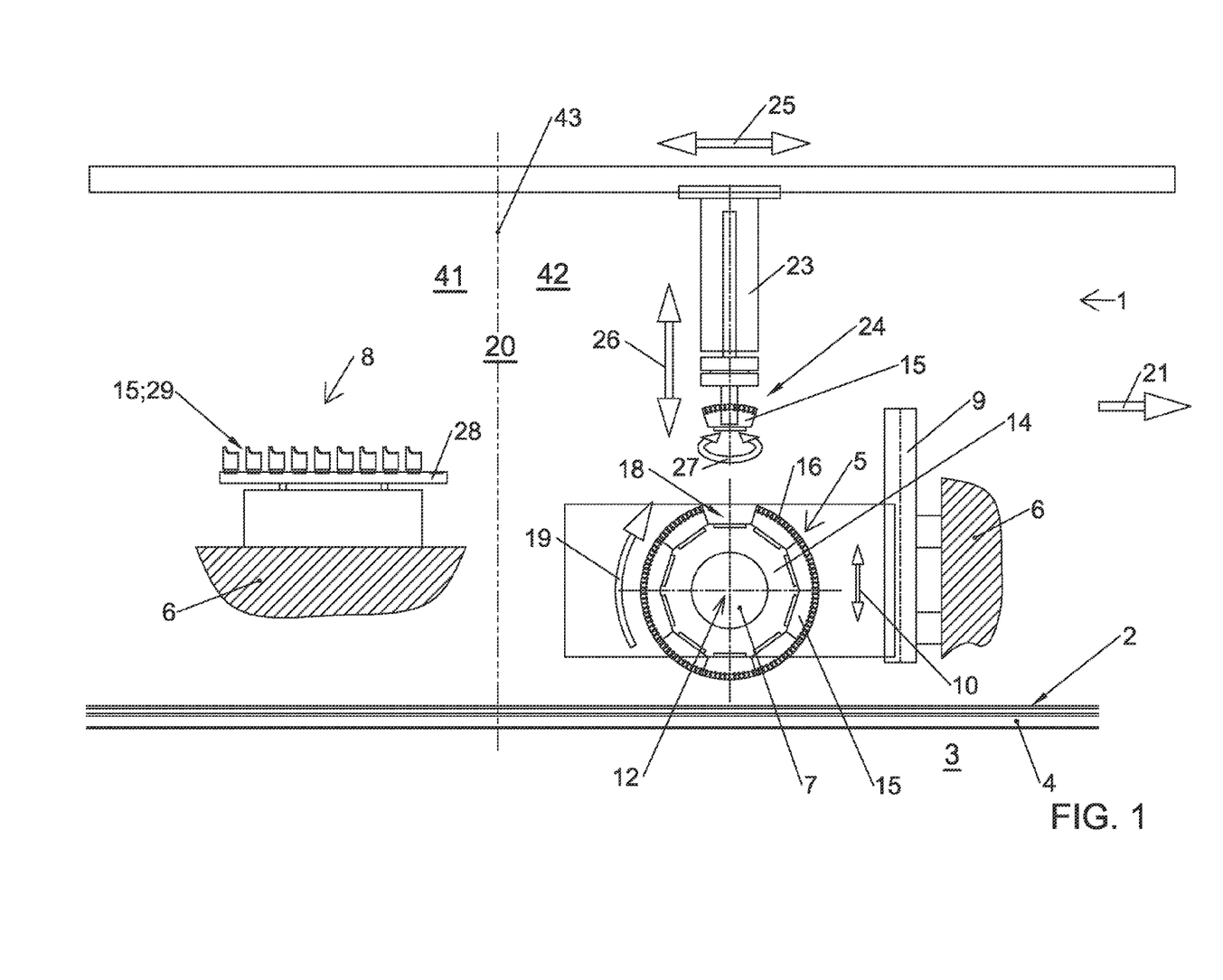
FIG. 1 is a schematic representation of a first embodiment of a fixture for milling a rail head of a rail track arranged in a track bed in a side view.
Figure 2:
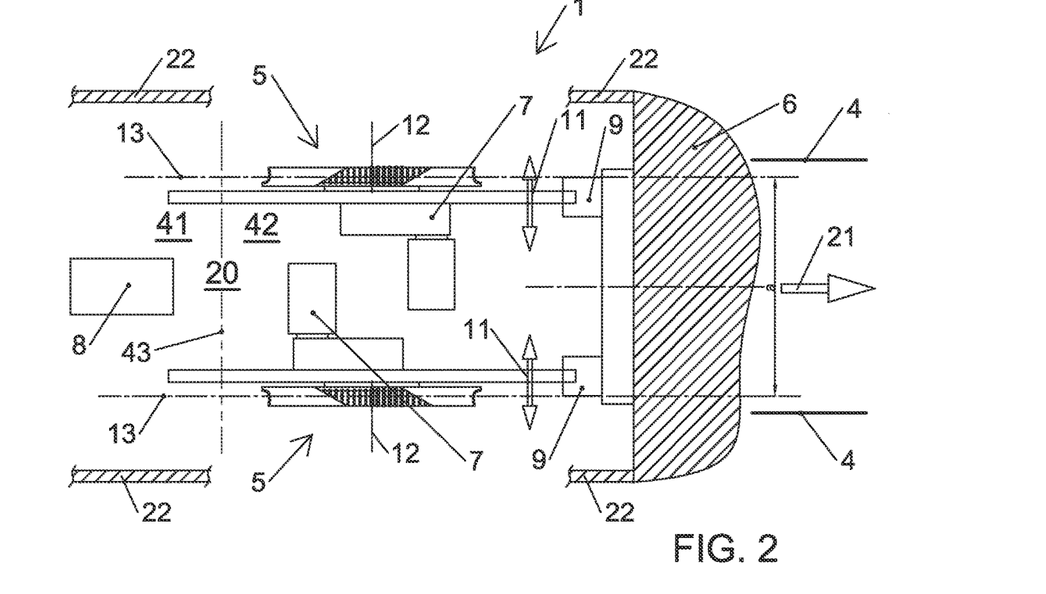
FIG. 2 is a schematic representation of the first embodiment of a fixture for milling a rail head of a rail track arranged in a track bed in a top view.

FIGS. 1 and 2 show a first embodiment of a movable fixture 1 for milling rail heads 2 of rail tracks 4 arranged in a track bed 3, with two independently rotating 19, driven milling heads 5. The fixture 1 comprises a chassis 6 for running on the rail tracks 4. The chassis 6 supports a milling head drive mechanism 7 and a working table 8 for each milling head 5. Furthermore, the chassis 6 supports an adjustment means 9 for positioning the milling head 5 in terms of height 10 and/or length 11 for each milling head 5. Indicated are the respective axes of rotation 12 and the planes of rotation 13 of the milling heads 5. The milling head 5 comprises a tool carrier 14, on which a plurality of carrier segments 15 are arranged, distributed along the periphery. A plurality of cassettes 16 are arranged on each carrier segment 15. The cassettes 16 support the cutting tooth/teeth 17 of the milling head 5 shown in FIGS. 4 to 9 and 12. In the illustrated embodiment, the tool carrier 14 has contact surfaces 18 for the carrier segments 15.

The fixture 1 has an operator's cab 20 that is supported by the chassis 6 and is limited by cab walls 22 that are parallel to the direction of travel 21. The operator's cab 20 includes a fitting space 41 and a milling space 42. The fitting space 41 and the milling space 42 can be separated from each other by an adjustable partition wall 43. The partition wall 43 is executed, for instance, as a roller shutter or a folding curtain. The milling head 5 is at least partially accessible from the operator's cab 20 and it is positioned within the cab walls 22. In addition to the milling head 5, the milling head drive mechanism 7 and the adjustment means 9 are arranged in the milling space 42. Each milling head 5 is mounted together with its milling head drive mechanism 7 on the adjustment means 9 and is adjustable along a plane between a working position and a transfer position in a direction perpendicular to the rail track 4. In FIGS. 1 and 2, the milling head 5 is shown in the transfer position.

In the operator's cab 20, a lifting device 23 is also arranged. The lifting device 23 has a segment gripper 24, which is capable of translational movement in the plane of rotation 13 of the milling head 5, as well as move in parallel 25 and perpendicularly 26 to the direction of travel 21. Furthermore, the segment gripper 24 is rotationally movable 27 perpendicular to the direction of travel 21.

In the embodiment of the fixture 1 shown here, only one feed direction specified as the direction of travel 21 is provided for machining of the rail 4. The rotation 19 of the milling head 5, also called direction of rotation is adjusted in relation to the direction of travel 21 so that the milling head 5 operates in synchronism.

Figure 3:
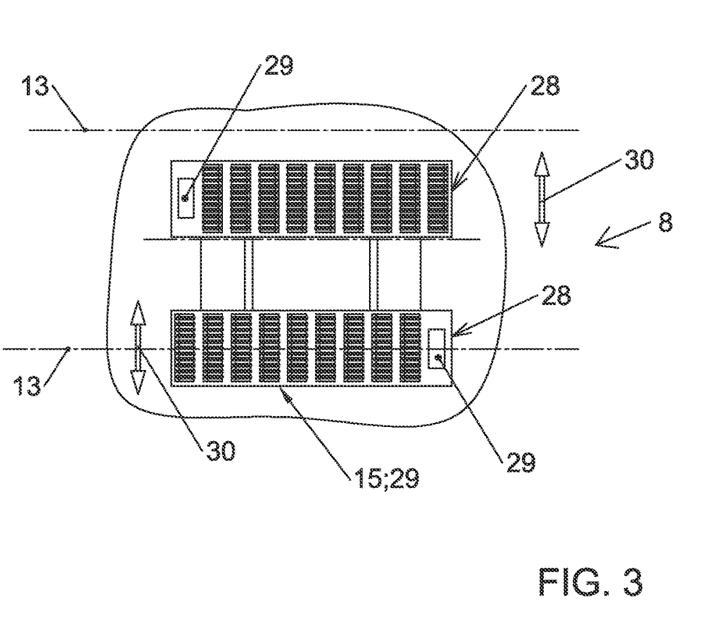
FIG. 3 is a schematic representation of a working table of the fixture shown in FIGS. 1 and 2.

FIGS. 1 to 3 show the working table 8 provided in the fitting space 41 of the operator's cab 20. This has two magazines 28, each of which has a plurality of slots 29 for carrier segments 15. The magazine 28 is movably 30 mounted between a maintenance position (shown at the top of FIG. 3) and a replacement position (shown at the bottom of FIG. 3) lying in the plane of rotation 13 of the milling head 5. Below the working table 8, a base that has space for tools and operating units of the fixture 1 is provided.

Figure 4:
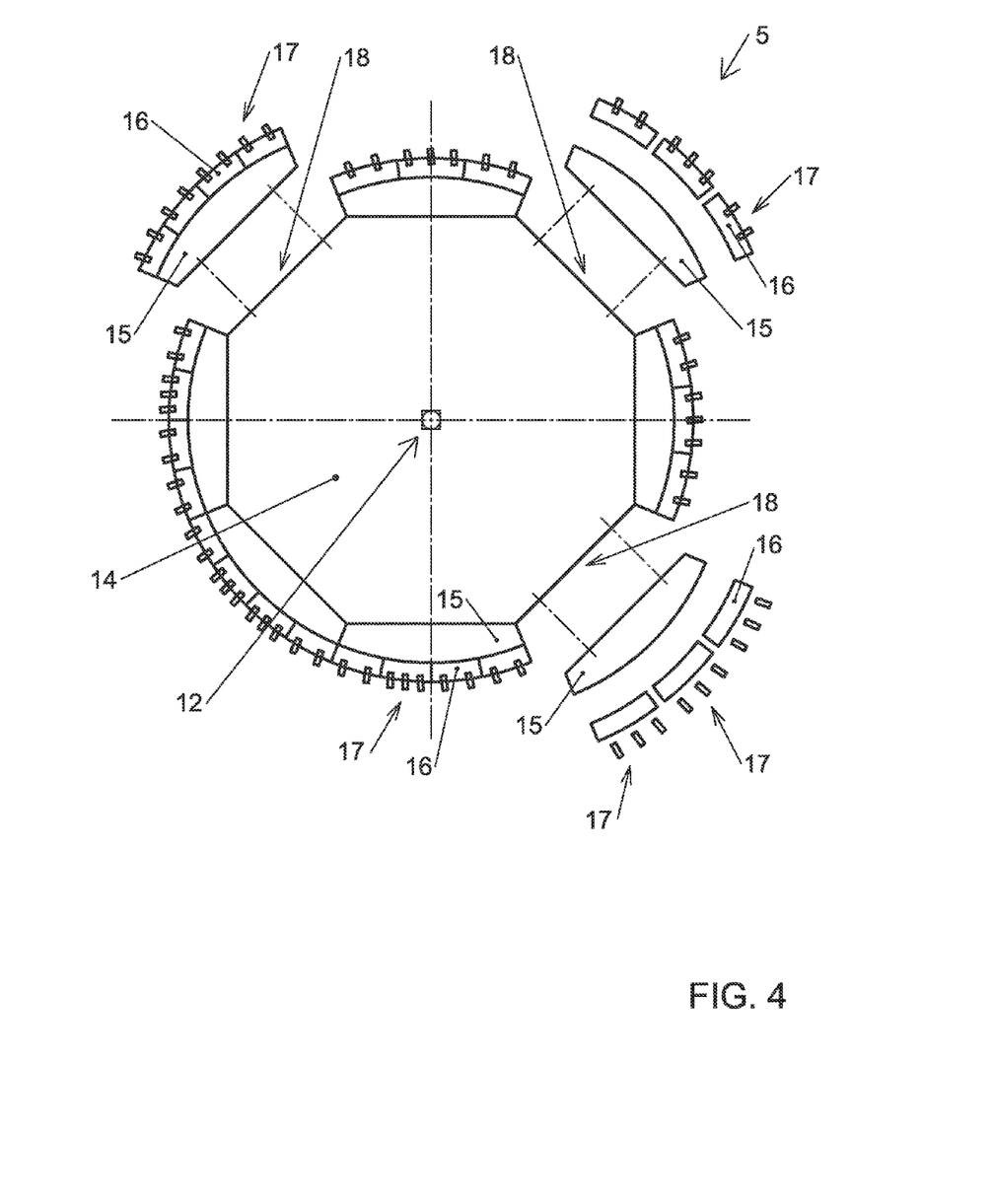
FIG. 4 is an enlarged schematic representation of a milling head of the fixture shown in FIGS. 1 and 2.

FIG. 4 shows the milling head 5 already described in FIGS. 1 and 2 in an enlarged view. The tool carrier 14 has a polygonal cross-sectional shape and ten contact surfaces 18 for housing a corresponding number of identical carrier segments 15. The carrier segments 15 are detachably mounted on the tool carrier 14 without using any tools, wherein each of the carrier segments 15 can be detached independently of the other carrier segments 15 of the tool carrier 14. Each of the carrier segments 15 carries a plurality of cassettes 16. The cassettes 16 are detachably fixed to the carrier segments 15. Each of the cassettes 16 in turn carries at least one cutting tooth 17. A cutting tooth 17 consists of a plurality of cutting plates 31 shown in FIG. 5. The cutting plates 31 are detachably attached to the cassettes 16. The profile of a rail head 2 is made up of approximately circular curved sections with different radii, wherein each curved section forms a lane on the running surface of the rail track 4. The milling head 5 or each cutting tooth 17 has as many cutting plates 31 as the number of curved sections or lanes of the respective rail head 2 to be milled, wherein a cutting plate 31 of a cutting tooth 17 is assigned to each lane.

Figure 5:
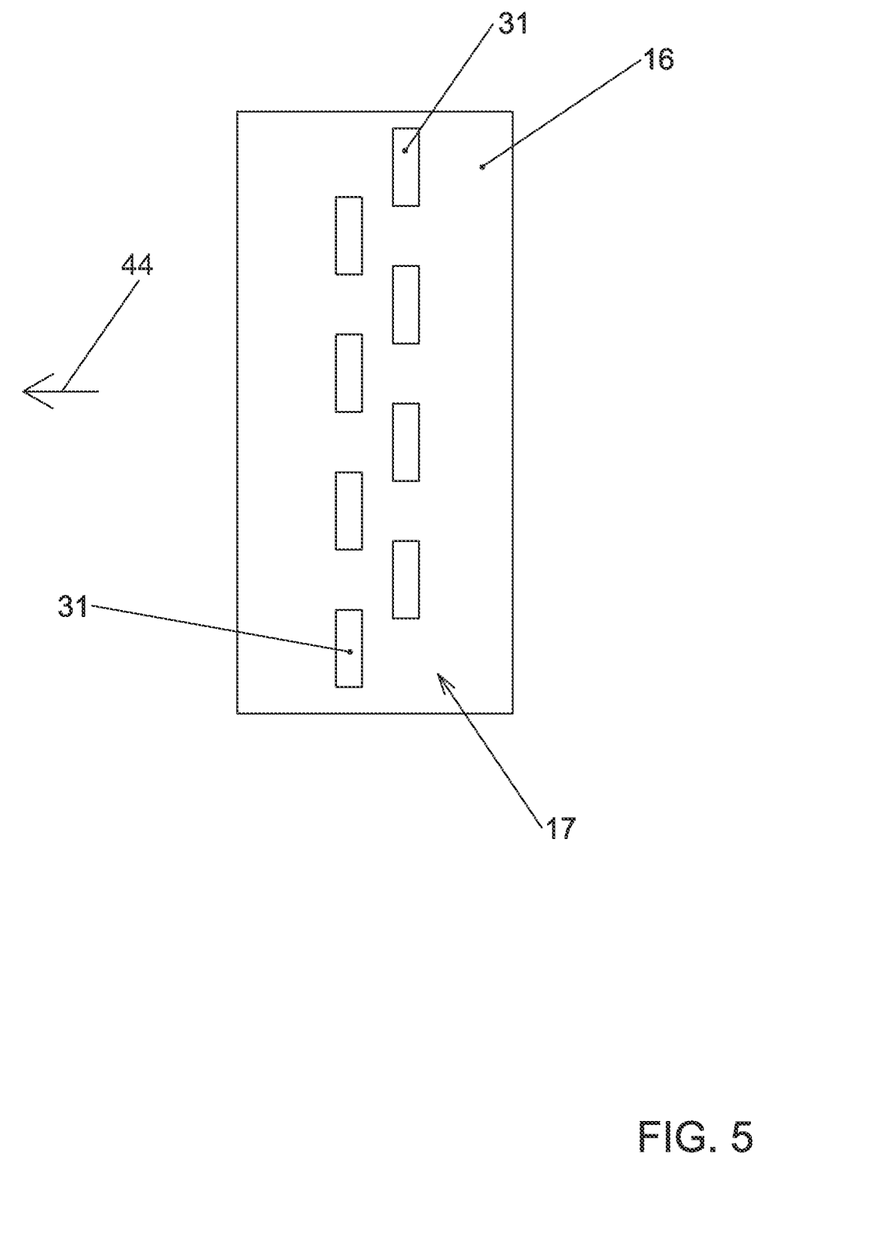
FIG. 5 is a schematic representation of a cassette of the fixture.

FIG. 5 shows a cassette 16 with a cutting tooth 17, which includes nine cutting plates 31. The cutting plates 31 are arranged preferably in two rows behind each other and alternately, offset from each other. An arrow 44 indicates the movement of a cassette 16 arranged on the milling head 5 during the rotation 19 of a milling head 5.

FIGS. 6 to 13 show different variants of the design of the cassettes 16. On the one hand, the cassettes 16 are different from each other in the number of cutting teeth 17 arranged on a cassette 16, and the distance 32 between the cutting teeth 17. On the other hand, the rake angle 33 of the individual cutting plates 31 and the work angle 35 of the individual cutting plates 31 are configured differently in the cassettes 16.

Figure 6:
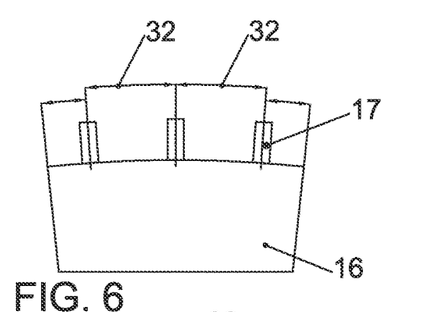
FIG. 6 is a schematic representation of a first variant of a cassette in a side view.

FIG. 6 shows a side view of a cassette 16 with three cutting teeth 17, which are distributed uniformly over the outer radius of the cassette 16. The distance 32 between the cutting teeth 17 is identical and corresponds to twice the distance of the outer cutting teeth 17 to the nearest edge of the cassette 16.

Figure 7:
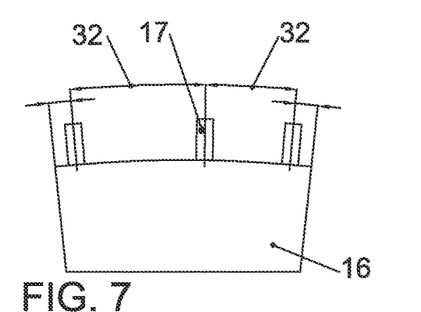
FIG. 7 is a schematic representation of a second variant of a cassette in a side view.
Figure 8:
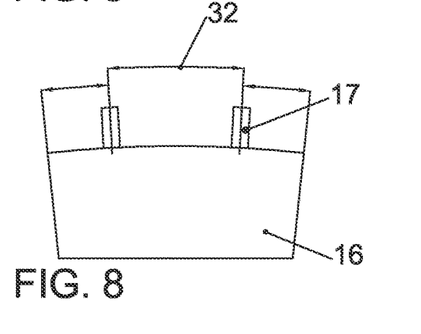
FIG. 8 is a schematic representation of a third variant of a cassette in a side view.
Figure 9:
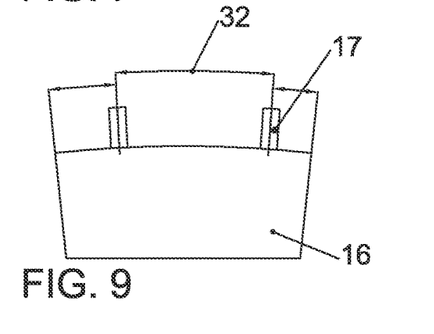
FIG. 9 is a schematic representation of a fourth variant of a cassette in a side view.

FIG. 7 shows a side view of a cassette 16 with three cutting teeth 17, which are distributed unevenly over the outer radius of the cassette 16. In doing so, the distances 32 between the cutting teeth 17 are different as well as the distances between the outer cutting teeth 17 and the nearest edges of the cassette 16.

FIG. 8 once again shows a side view of a cassette 16 with a uniform distribution. However, only two cutting teeth 17 are arranged on this cassette 16.

FIG. 9 once again shows a side view of a cassette 16 with a non-uniform distribution and two cutting teeth 17.

Figure 10:
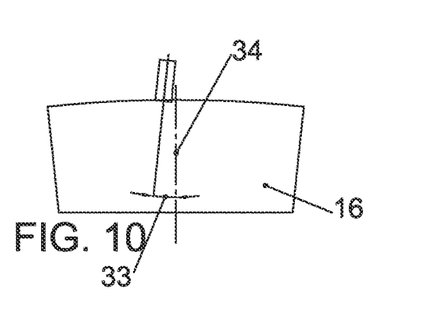
FIG. 10 is a schematic representation of a fifth variant of a cassette in a sectional view.
Figure 11:
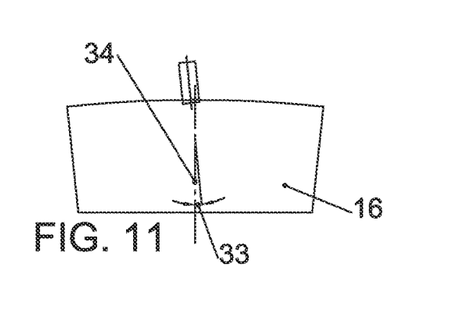
FIG. 11 is a schematic representation of a sixth variant of a cassette in a sectional view.

FIGS. 10 and 11 respectively show a sectional view of a cassette 16 with a cutting plate 31. The cutting plates 31 have different rake angles 33.

Figure 12:
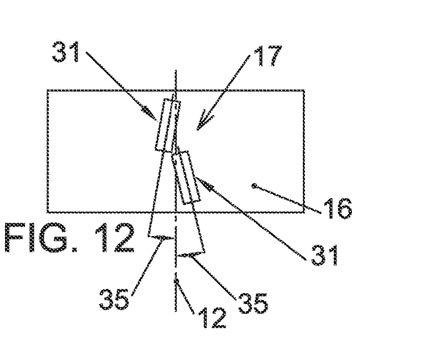
FIG. 12 is a schematic representation of a seventh variant of a cassette in a top view.

FIG. 12 shows a top view of a cassette 16 with one cutting tooth 17 consisting of two cutting plates 31. The cutting plates 31 have different pitch angles 35.

Figure 13:
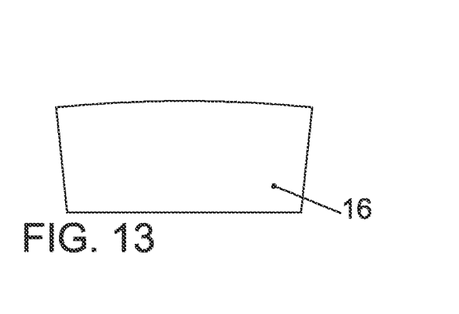
FIG. 13 is a schematic representation of an eighth variant of a cassette in a side view.

FIG. 13 shows a side view of a cassette 16, which does not have any cutting tooth 17 or cutting plate 31.

The FIGS. 14 to 17 show a section of the milling head 5 of further embodiments of the fixture 1 in sectional views. Each of the cutting plates 31 is fixed individually to one of the cassettes 16 using a fastener designed as a screwed connection, such that it can be detached. A tool, which works together with the fasteners, is required for installing and removing the individual cutting plates 31. Several cassettes 16 fixed to one of the carrier segments 15 such that they can be detached, are connected to the carrier segment 15 using another common or individual fastener, and/or using a common or individual retaining means. Each of the identical carrier segments 15 is fixed to the tool carrier 14, independent of the other carrier segments 15 of the respective milling head 5, such that it can be detached. Locking devices 36 are provided for connecting the tool carrier 14 and the carrier segment 15. The locking devices 36 consist of two parts: one active part and one passive part. The passive part is preferably designed as a symmetrically rotating pin 37. The active part is preferably designed as a bush 38 that supports the pin 37. The locking devices 36 help in detachable fixing and in aligning the carrier segments 15 and the tool carrier 14 with each other. The locking devices 36 are designed to be operated using a pressurized fluid and thus do not require tools to operate. The tool carrier 14 has at least one contact surface 18 to support, for example, one of the eight carrier segments 15. Each of the carrier segments 15 has at least one mounting surface 39, which is associated with one of the contact surfaces 18. The contact surfaces 18 and mounting surfaces 39 which are associated with each other, are designed to be flat and parallel.

Figure 14:
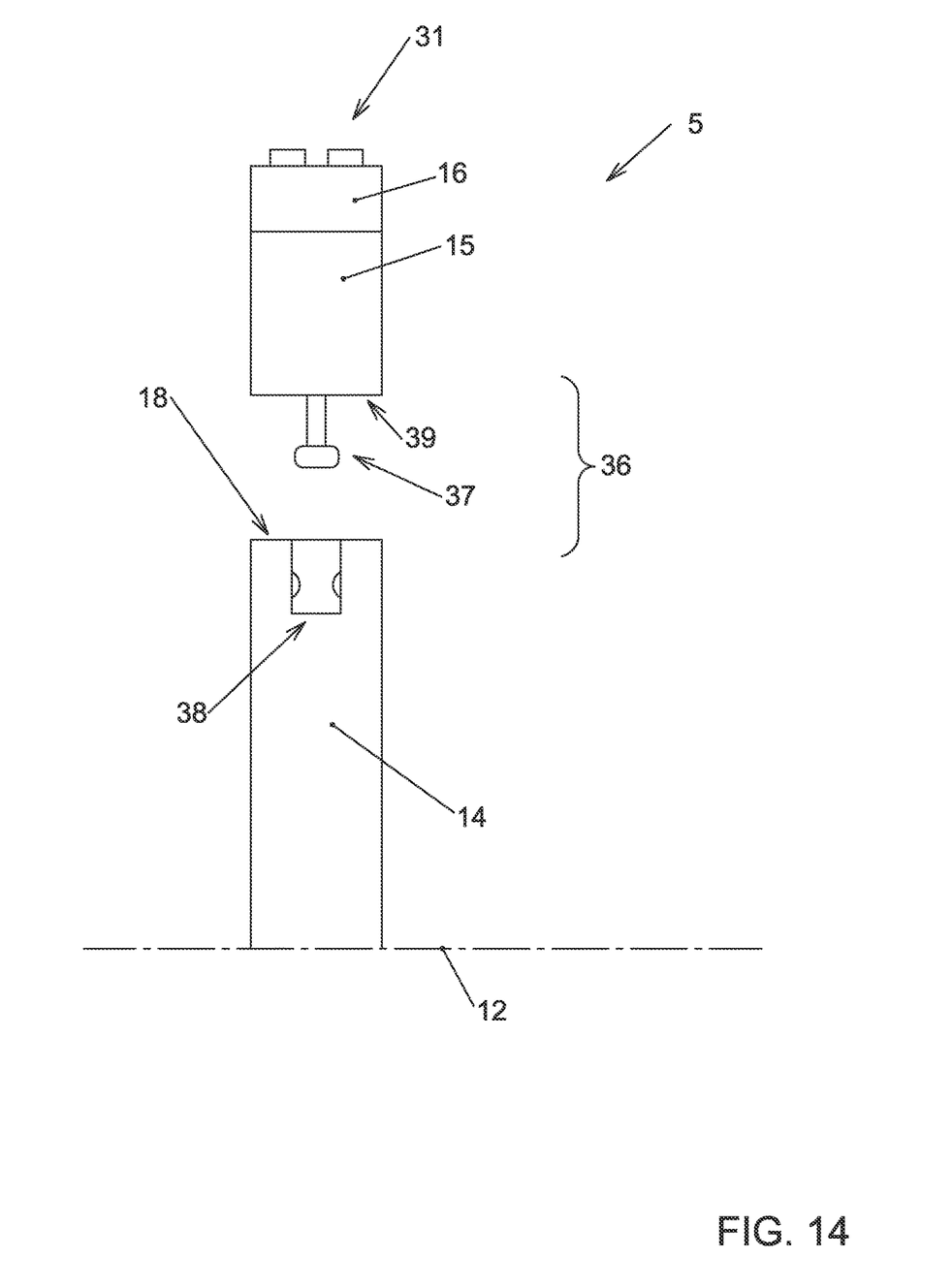
FIG. 14 is a schematic representation of a cut-out of a second embodiment of the fixture in a sectional view.

FIG. 14 shows a sectional view of the milling head 5 of a second embodiment of the fixture 1. In this embodiment, the tool carrier 14 has eight contact surfaces 18 distributed across its length, that is, one for each of the eight carrier segments 15. The contact surfaces 18 are the radial outer sides of the tool carrier 14. At the point where the distance between one contact surface 18 and the rotational axis 12 is minimum, each of the contact surfaces 18 is aligned vertically to the radius 34 of the milling head 5. The pin 37 of the locking device 36 is arranged on the carrier segment 15 and raised with respect to the mounting surface 39 of the carrier segment 15. The bush 38 of the locking device 36 is arranged with recess in the tool carrier 14 below the contact surface 18. The central longitudinal axis and/or axis of symmetry of the pin 37 and bush 38 is aligned at right angles to the contact surface 18 and at right angles to the mounting surface 39. The pin 37 has an undercut, which interacts with a operable neck of the bush 38 for holding and releasing. To operate the locking device 36, the neck of the bush 38 is connected to a fluid circulation system of the fixture 1 or can be connected to it.

Figure 15:
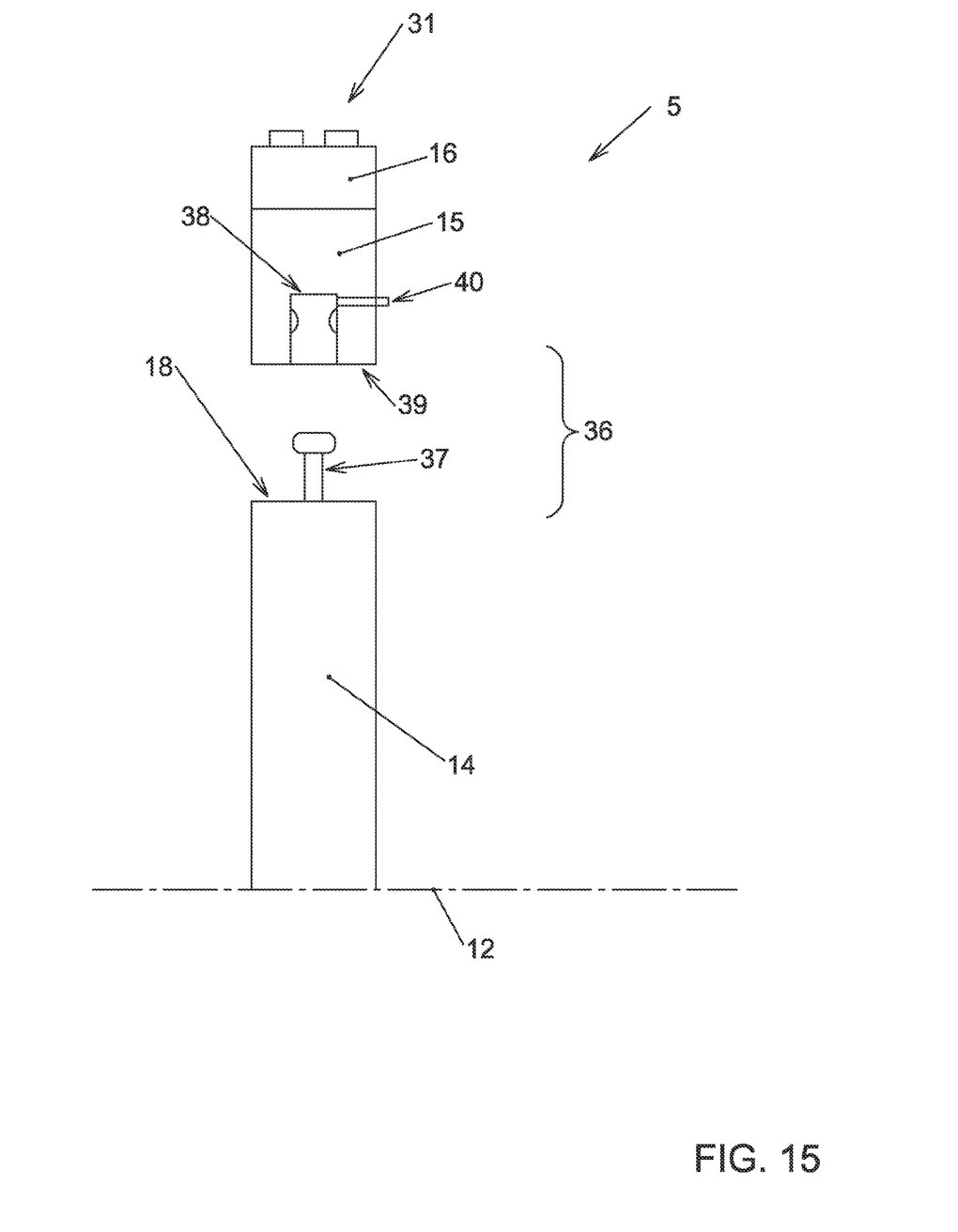
FIG. 15 is a schematic representation of a cut-out of a third embodiment of the fixture in a sectional view.

FIG. 15 shows a sectional view of the milling head 5 of a third embodiment of the fixture 1. This embodiment is quite similar to the one shown in FIG. 14. The difference is the arrangement of the bush 38 in the carrier segment 15 below the mounting surface 39 and the pin 37 raised at the tool carrier 14 with respect to the contact surface 18. To operate the locking device 36, the bush 38 has to be connected to a fluid circulation system, for example, to that of the fixture 1. For this purpose, the carrier segment 15 has an end connection 40.

Figure 16:
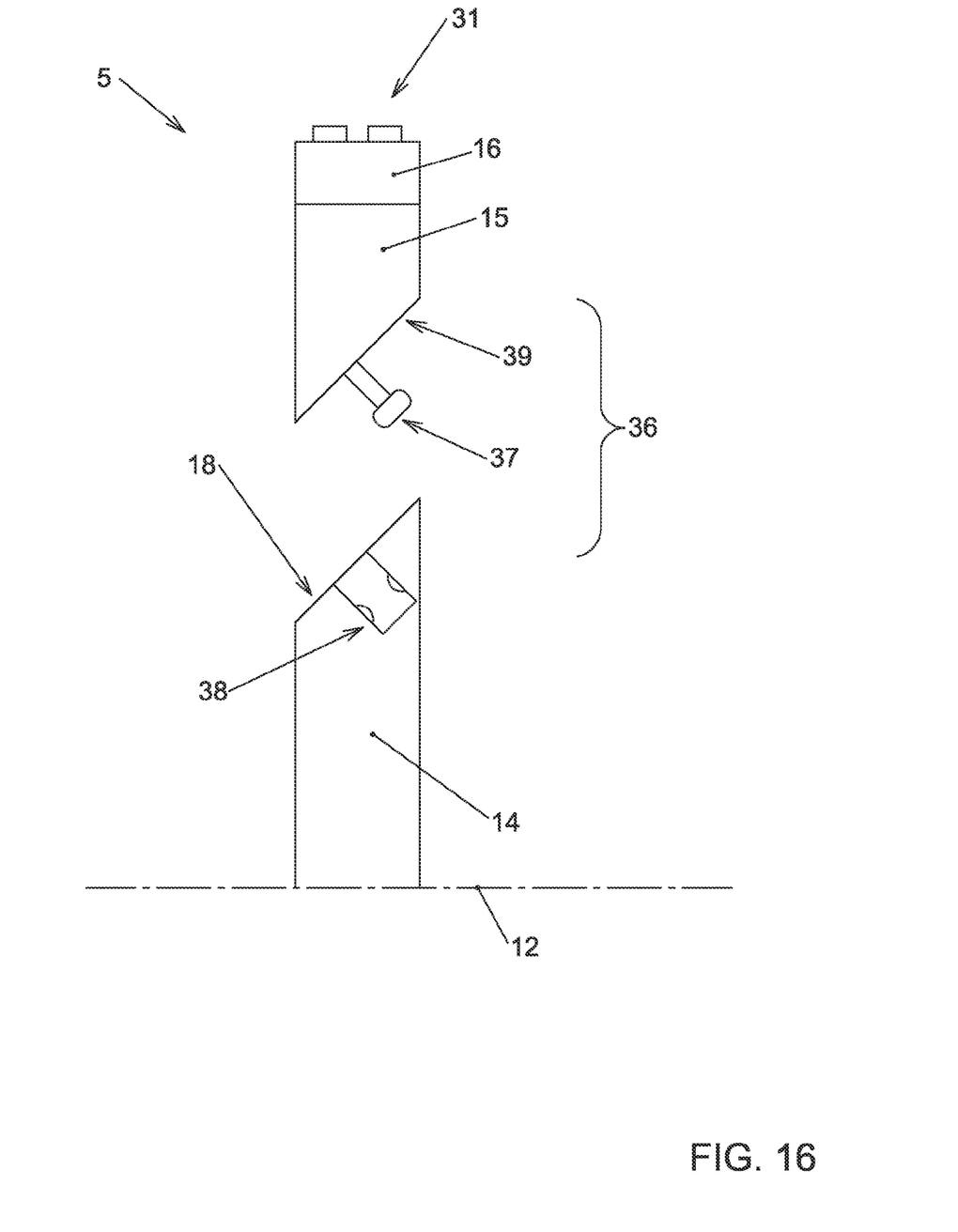
FIG. 16 is a schematic representation of a cut-out of a fourth embodiment of the fixture in a sectional view.

FIG. 16 shows a sectional view of the milling head 5 of a fourth embodiment of the fixture 1. This embodiment is almost the same as the second embodiment shown in FIG. 14. The differences in the fourth embodiment are the parallel and just described contact surfaces 18 and mounting surfaces 39, which are inclined with respect to a plane that is at right angles to the rotational axis 12 of the milling head 5. This makes it easy to handle the carrier segments 15 during replacement. The inclination angle is preferably 30 to 60 degrees.

Figure 17:
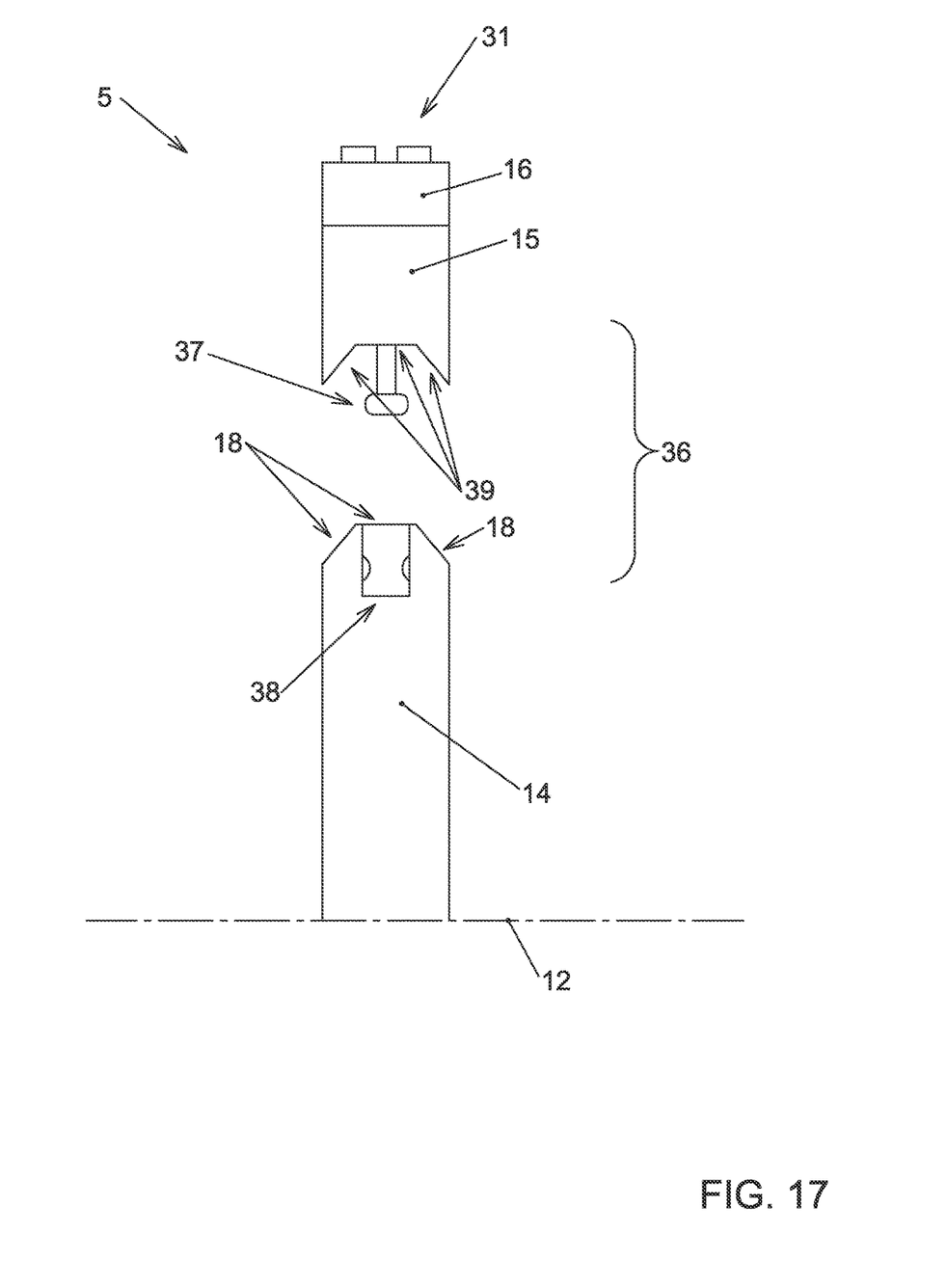
FIG. 17 is a schematic representation of a cut-out of a fifth embodiment of the fixture in a sectional view.
Figure 18:
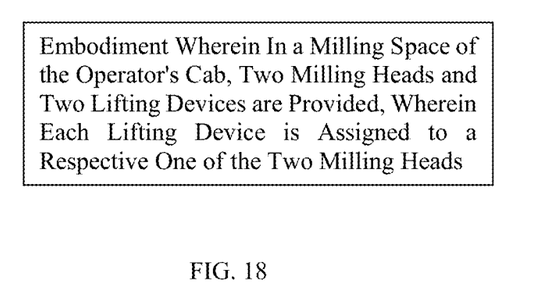
FIG. 18 is a schematic representation of an alternative embodiment wherein two lifting devices are provided.

FIG. 17 shows a sectional view of the milling head 5 of a fifth embodiment of the fixture 1. This embodiment is almost the same as the second embodiment shown in FIG. 14. The difference is that the tool carrier 14, in the fifth embodiment, has several, especially three contact surfaces 18 for each carrier segment 15. At least two of the contact surfaces 18 associated with one carrier segment 15, have different inclination angles with respect to a plane that is at right angle to the rotational axis 12 of the milling head 5. The mounting surfaces 39 are designed in parallel to the respective contact surfaces 18.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A movable fixture for milling rail heads of slide rails arranged in a track bed, the movable fixture comprising:
 a rotating milling head mounted to a milling head drive mechanism supported by a chassis, wherein the milling head comprises cutting plates for milling the rail heads,
 wherein the milling head has a disc-shaped tool carrier connected to the milling head drive mechanism, wherein the disc-shaped tool carrier has a polygonal cross-sectional shape, wherein the sides of the polygonal cross-sectional shape each form a respective contact surface for supporting a respective one of a plurality of carrier segments that are arranged around the periphery of the disc-shaped tool carrier, a plurality of cassettes attached to each of the carrier segments, each of the cassettes being assembled with at least two of the cutting plates, the carrier segments being detachably connected to the tool carrier, and
 wherein the cassettes are each arranged peripherally on the tool carrier with the respective at least two assembled cutting plates, the cassettes each being different with regard to at least one of: a number of the cutting plates; distances of the cutting plates of the respective cassette from each other; rake angle, in a plane of rotation of the milling head, of the individual cutting plates of the respective cassette; or inclination angle, in a plane perpendicular to the plane of rotation of the milling head, of the individual cutting plates of the respective cassette.

2. The movable fixture for milling rail heads according to claim 1, wherein the fixture includes an operator's cab supported by the chassis and bound by cab walls aligned in parallel to a direction of travel of the fixture, and wherein the milling head, the milling head drive mechanism, and an adjustment means are arranged between the cab walls.

3. The movable fixture for milling rail heads according to claim 2, wherein the milling head and the milling head drive mechanism are supported together on the adjustment means and can be adjusted in a plane at a right angle to the slide rails.

4. The movable fixture for milling rail heads according to claim 2, further comprising a lifting device arranged in the operator's cab, which lifting device includes a segment gripper that can (a) move translationally parallel to and at a right angle to the direction of travel, in the plane of rotation of the milling head, or (b) can rotate around an axis at a right angle to the direction of travel and move translationally parallel to and at a right angle to the direction of travel, regardless of the plane of rotation of the milling head.

5. The movable fixture for milling rail heads according to claim 2, further comprising a working table having a magazine with a plurality of slots, the working table being arranged in a fitting space in the operator's cab, wherein the magazine is housed so as to be able to be moved between (a) a maintenance position and (b) a changing position in a plane of rotation of the milling head.

6. The movable fixture for milling rail heads according to claim 2, wherein in a milling space of the operator's cab, the rotating milling head, an additional milling head, and one single adjustable lifting device are arranged between rotational planes of the milling heads, or wherein in the milling space of the operator's cab, the rotating milling head, the additional milling head, and a respective lifting device for each of the milling heads are arranged.

7. The movable fixture for milling rail heads according to claim 1, wherein the polygonal cross-sectional shape of the tool carrier has more than six contact surfaces, each for supporting a respective one of the carrier segments.

8. The movable fixture for milling rail heads according to claim 7, wherein the polygonal cross-sectional shape of the tool carrier has eight to twelve contact surfaces, each for supporting a respective one of the carrier segments.

9. The movable fixture for milling rail heads according to claim 1, wherein the carrier segments and the cassettes are configured for at least one of:
 (a) universal mounting of every cassette on each of the carrier segments and in every position in a given carrier segment, or
 (b) for the same number of cassettes to be mounted on each of the carrier segments such that the cassettes can be detached.

10. The movable fixture for milling rail heads according to claim 9, wherein five to eight of the cassettes are arranged on one of the carrier segments.

11. The movable fixture for milling rail heads according to claim 1, wherein at least one of the milling head or the milling head drive mechanism is provided to an adjustment means for adjusting the milling head vertically or horizontally.

12. A method for replacing the cutting plates of the rotating milling head in the movable fixture according to claim 1 for milling rail heads of slide rails arranged in the track bed, the method comprising:
 upon reaching a defined wear criterion of the cutting plates on the milling head, replacing plural ones of the cutting plates as a group at the same time by detaching one of the carrier segments from the disc-shaped tool carrier of the milling head, and removing the one carrier segment from the milling head; and
 arranging and mounting another carrier segment on the disc-shaped tool carrier.

13. The method for replacing cutting plates according to claim 12, wherein the carrier segments are fixed to the tool carrier or detached from the tool carrier by at least one of automatically or manually operating a locking device.

14. The method for replacing cutting plates according to claim 13, wherein the carrier segments are individually fixed to or detached from the tool carrier.

15. The method for replacing cutting plates according to claim 12, wherein the replacement of one, a plurality, or all the carrier segments of the milling head is carried out in an operator's cab of the movable fixture.

16. The method for replacing cutting plates according to claim 15, wherein the replacement of cassettes removed from the milling head is carried out on a working table arranged in the movable fixture.

17. The method for replacing cutting plates according to claim 12, wherein the replacement of cassettes removed from the milling head is carried out on a working table arranged in the movable fixture.

18. The method for replacing cutting plates according to claim 12, wherein within a fitting space of an operator's cab of the movable fixture, on one of the carrier segments removed from the milling head, one, a plurality, or all the cassettes are replaced, or the cutting plates on the cassettes are replaced.

19. The method for replacing cutting plates according to claim 12, wherein the carrier segments are removed from the tool carrier using a lifting device.

20. A movable fixture for milling rail heads of slide rails arranged in a track bed, the movable fixture comprising:
  a rotating milling head mounted to a milling head drive mechanism supported by a chassis, wherein the milling head comprises cutting plates for milling the rail heads,
  wherein the milling head has a disc-shaped tool carrier connected to the milling head drive mechanism, a plurality of carrier segments being arranged around the periphery of the disc-shaped tool carrier, a plurality of cassettes attached to each of the carrier segments, each of the cassettes being assembled with at least two of the cutting plates, the carrier segments each being detachably connected to the tool carrier via a respective fluid-actuated locking device, and
  wherein the cassettes are each arranged peripherally on the tool carrier with the respective at least two assembled cutting plates, the cassettes each being different with regard to at least one of: a number of the cutting plates; distances of the cutting plates of the respective cassette from each other; rake angle, in a plane of rotation of the milling head, of the individual cutting plates of the respective cassette; or inclination angle, in a plane perpendicular to the plane of rotation of the milling head, of the individual cutting plates of the respective cassette.

* * * * *